United States Patent Office 2,793,541
Patented May 28, 1957

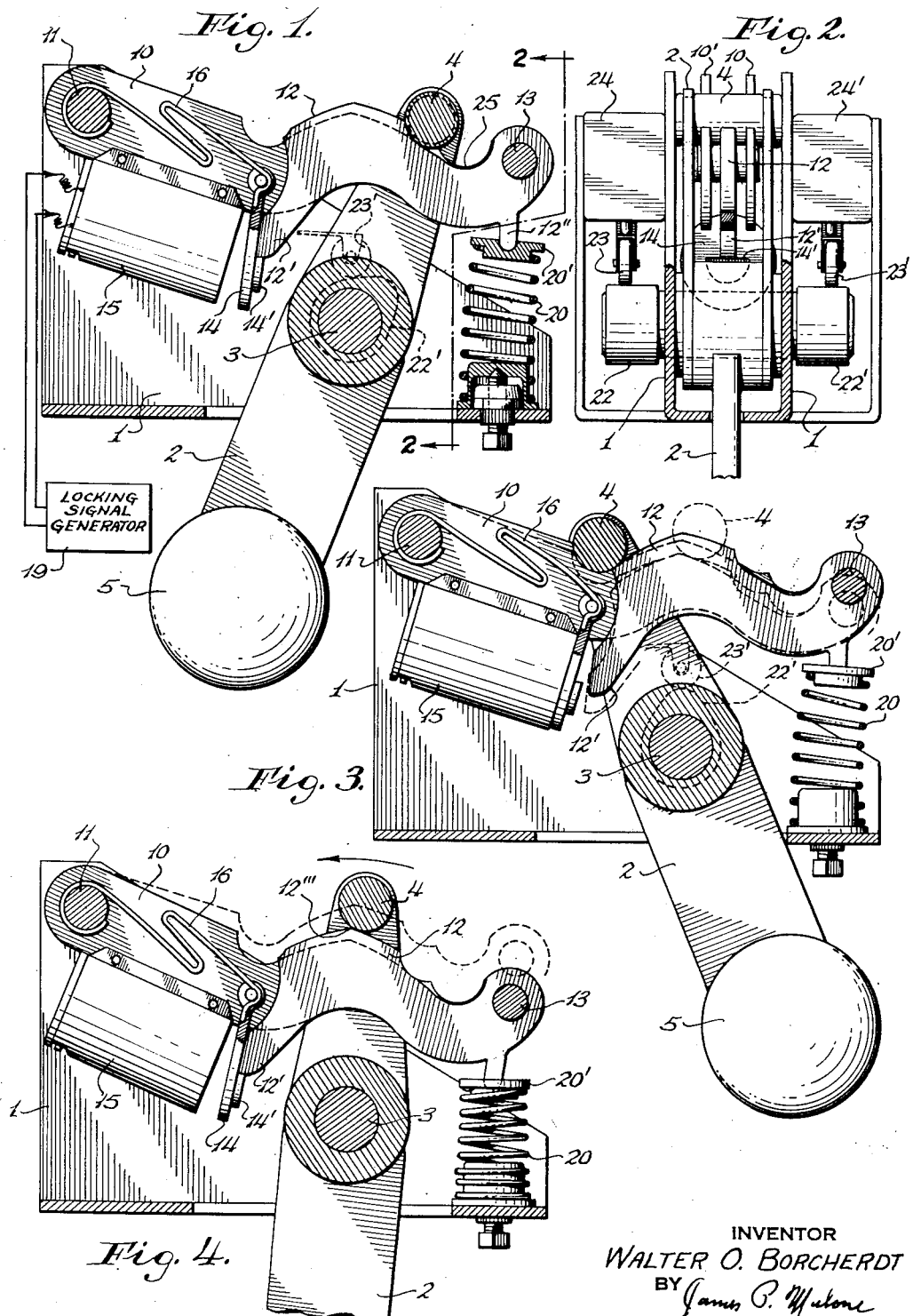

2,793,541

SAFETY LOCKED CONTROL HANDLE WITH OVERRIDE

Walter O. Borcherdt, Mountain Lakes, N. J., assignor to M. J. Johnson Aircraft Engineering Co., Morris Plains, N. J., a corporation of New Jersey Application May 11, 1953, Serial No. 354,245

5 Claims. (Cl. 74—528)

This invention relates to safety locked control handles and more particularly to such controls having an emergency override feature.

It is dangerous to operate many control handles under certain conditions. That is, certain conditions precedent may exist for the proper operation of the control function. For instance, in retracting the wheels of an aircraft, it is essential that the craft be airborne. To operate the wheel retracting control when the craft is on the ground would be disastrous. Therefore, safety locked controls are generally provided to prevent a careless mistake.

The above illustration is only a typical example since the use of safety locked controls is essential in many instances. For instance, when turning on an automatic pilot all controls must be carefully neutralized. Also, when starting complicated machinery, quite often a certain sequence of operations is prescribed and safety controls are provided to avoid breaking the sequence. Similar applications will occur in industrial processes such as chemical processes.

However, once the safety lock is installed, another problem arises. Referring again to the wheel retracting example, suppose the pilot or operator is fully alert, but that the safety circuit fails. For instance, suppose the plane is airborne and the wheel retracting control remains locked due to a failure of the locking mechanism. In such case, since the pilot knows he is airborne, it is perfectly safe for him to override the locking device. The overriding means must require greater effort than an ordinary movement of the control so that the pilot or operator is fully aware that he is overriding the safety system. However, the overriding means must not induce any appreciable delay or be unduly complicated, since in many applications such delay may be very dangerous.

The present invention provides a pivotally mounted control handle, a pivotally mounted detent member connected to provide detents for said handle, a cam pivotally mounted on said detent member and adapted to lock the handle and a solenoid and armature connected to lock the cam. The cam is arranged so that it may be overridden by the handle by rotating the entire detent arm assembly against the pressure of a strong spring. The force required to override the locking mechanism is preferably about ten or more times that required for normal operating movements so that the operator will be fully aware that he is overriding the safety lock due to the large amount of extra force required.

Accordingly, a principal object of the invention is to provide new and improved control means.

Another object of the present invention is to provide new and improved control means with safety lock means.

Another object of the present invention is to provide new and improved control means which are adapted to be automatically safety locked from a remote position and having override means.

Another object of the present invention is to provide new and improved control handle detent means, locking means adapted to lock the handle in one of said detents, said locking means adapted to be remotely operated and means provided to override said locking means under emergency conditions caused by failure of the locking means.

Another object of the present invention is to provide new and improved safety lock control means comprising a control handle, a cam adapted to oppose movement of said handle with a predetermined force, means connected to lock said cam from a remote point and means provided to override said locking cam.

These and other objects of the invention will be apparent from the following specification and drawings of which:

Figure 1 is a side sectional view of an embodiment of the invention.

Figure 2 is a sectional view of the embodiment of Figure 1 taken along the line 2—2.

Figure 3 is a side view of the embodiment of Figure 1 showing the cam in unlocked position.

Figure 4 is a side view of the invention showing the locking cam in locked position and being overridden by the control handle.

Referring to Figures 1 and 2, there is shown a main bracket 1 upon which a control handle 2 is pivotally mounted at 3. The control handle 2 has a roller pivotally connected to one end and a hand grip 5 connected to the other end and adapted to be held in the hand of the operator.

A pair of parallel elongated detent members 10 and 10' are pivotally connected to the bracket 2 at the point 11. A link lock cam 12 is pivotally connected to and between the parallel detent members 10 and 10' at the point 13. The cam 12 is adapted to be locked by the armature 14 which is pivotally mounted on the detent members 10 and 10'.

The armature 14 is adapted to be energized by the solenoid 15 also mounted on the detent members 10 and 10'. The spring 16 connected to the armature 14 is adapted to keep the armature in the cam locked position as shown in Figure 1.

The operation of the control handle system is as follows:

When solenoid 15 is not energized, the armature 14 having extension 14' will be so positioned that the extension 14' will be under the lower left hand portion 12' of the cam 12 as in Figure 1. The first detent in the upper right hand portion of the cam 12 bears against the roller 4 of the handle 2 and will oppose any counterclockwise motion of the handle 2.

The projection 12" at the lower right hand portion of cam 12 rests in a socket in the top plate 20' of spring 20. Note that the spring axis is displaced from the axis of the projection 12" thereby tilting the spring and providing a force on the cam 12 tending to hold it up, i. e. clockwise about pivot point 13.

The solenoid 15 is adapted to be energized from a remote point by locking signal generator 19 which may be a switch and power source, the switch being adapted to be actuated by means responsive to the condition to be guarded against. In the wheel retracting system the locking signal generator switch may be actuated by the wheel shock absorbers.

Figure 3 shows the operation of the invention when the cam is unlocked. In such case as the handle 2 is moved counterclockwise the cam 12 is free to rotate about the point 13 on the detent members 10—10', and the cam is depressed so that the roller 4 of the handle 2 rolls easily over the cam 12 to the second detent position shown.

Figure 4 shows the cam 12 in locked position and being overridden by the handle 2. In this case the cam 12 is locked by the armature 14 so that it cannot rotate about the point 13 and it therefore opposes counterclockwise motion of the handle 2.

However, as previously mentioned, under emergency conditions the pilot may override the locking cam. This is done by applying extra force to the handle so that it forces the detent members 10 and 10' to rotate about the point 11 where they are pivotally connected to the main bracket 1 against the pressure of the spring 20 which supports the right hand end of the detent members 10—10'. The cam member 12 has finger 12' which fits into a recess in the top spring plate 20' like a ball and socket joint. Therefore, by the application of sufficient force, the locking system may be overridden by causing the entire detent member assembly 10 to rotate clockwise against the force of the spring 20.

The dotted lines of Figure 4 show the original position of the upper edge of the detent members 10—10'. Note that there is a definite slant to each side of top center of the cam 12 so that it comes to a definite division point 12'. This insures that there is no dead center on the cam and that the handle 2 will snap to one of the detent positions and cannot be balanced at any point between them.

Thus far, we have shown only the control handle and its locking mechanism, but have not shown what is controlled. The apparatus controlled may be connected to the control handle by any conventional means such as a mechanical linkage. Alternatively, the control handle may be adapted to actuate a switch, potentiometer, or other control signal generator. In the present embodiment as shown in Figures 1 and 2 the control handle is adapted to actuate an electric switch of the miniature snap-action type by means of a small cam 22 connected to the main axis of the control handle. The small cam 22 is adapted to actuate the roller 23 of the snap-action switch 24 which is connected in a circuit for controlling whatever is to be controlled in conventional manner. However, this is beyond the scope of the present invention and will not be discussed here.

The present invention is also provided with a third detent portion 25 to the right of the position previously discussed. The handle may be rotated clockwise to this position for performing some other useful control function. The control signal for this function may be provided in similar manner by providing another small cam 22' Figure 2 on the other side of the control handle axis which small cam is adapted to actuate the roller 23' of a second snap-action switch 24'. This auxiliary control signal may be used as a supplement to the main control or to control some other function. For instance, in the case of the wheel retracting system, the primary snap-action switch 24 generally energizes a hydraulic control system for retracting the wheels. The auxiliary detent portion 25 and its associated or snap-action switch 24' might be used to energize an auxiliary electrical system for retracting the wheels in the event that the hydraulic system fails for some reason.

Therefore, the present invention provides a safety locked control handle which is adapted to be locked from a remote position in the illustration of the wheel retracting on an air-craft. The locking signal would be provided by a switch connected to the shock absorbers of the wheels so that when there is no weight on the wheels, the control handle would be unlocked, since the wheels could then be safely retracted. Many other modifications and typical applications of the present invention will occur to those who are faced with similar control problems for many varied types of apparatus. The present invention may be used in any application where a definite sequence of operations is required. For instance, in connecting an electric generator to a line, the generator must have the proper speed and phase of voltage before it may be connected into the line and automatic locking on the control switch may be provided in such a case.

There are many other industrial and chemical processes where definite sequences of operations must be observed or where the controlled operation might be dangerous under certain conditions. Temperature or pressure type systems are typical examples of devices or systems which might be equipped with the safety locked control handle having an override feature as in the present invention.

I claim:

1. A safety locked control handle with override comprising, a pivotally mounted control handle, a pivotally mounted indented member connected and adapted to provide detents for said handle, a cam pivotally mounted on said indented member, said cam being adapted to increase the depth of said detents to lock said handle, and a solenoid connected and adapted to lock said cam, said handle being connected and adapted to override said cam with the exercise of emergency force.

2. A safety locked control handle with override comprising, a pivotally mounted control handle, a pivotally mounted detented member connected and adapted to provide detents for said handle, a cam pivotally mounted on said detented member, said cam being adapted to lock said handle, a solenoid connected and adapted to lock said cam, said handle being connected and adapted to override said cam with the exercise of emergency force, and control signal takeoff means connected to said control handle.

3. Apparatus as in claim 2 wherein said detented member has a plurality of detents and said control signal takeoff means has a plurality of takeoff means associated with each detent.

4. A safety locked control handle with override comprising, a pivotally mounted control handle, a pivotally mounted detented member connected and adapted to provide detents for said handle, a cam pivotally mounted on said detented member, said cam being adapted to lock said handle, a solenoid connected and adapted to lock said cam, said handle being connected and adapted to override said cam with the exercise of emergency force, a second cam connected to said control handle, and a switch connected and adapted to be actuated by said second cam.

5. Safety locked control means comprising a control handle pivotally mounted on a main bracket, a pair of parallel elongated members pivotally connected to said bracket at one of their ends, a spring mounted on said bracket and connected to one end of said parallel members, said parallel members having detents adapted to cooperate with said control handle, a cam mounted between said parallel members and pivotally connected thereto at their spring supported end, a solenoid mounted on said parallel detent members, an arm pivotally mounted on said detented members and adapted to lock said cam and to be actuated by said solenoid to unlock said cam, said handle being adapted to override said cam lock by rotating said parallel detented members against the force of said spring.

References Cited in the file of this patent

UNITED STATES PATENTS

| 1,064,608 | Burt | June 10, 1913 |
| 1,323,661 | Urton | Dec. 2, 1919 |
| 1,471,730 | Haskin | Oct. 23, 1923 |
| 1,740,725 | Brown | Dec. 24, 1929 |
| 1,774,738 | Vaught | Sept. 2, 1930 |
| 2,435,037 | Gardiner et al. | Jan. 27, 1948 |
| 2,641,395 | Engle | June 9, 1953 |

FOREIGN PATENTS

| 475,164 | Great Britain | Nov. 12, 1937 |
| 991,748 | France | June 27, 1951 |